United States Patent [19] [11] 4,005,242
Kopke et al. [45] Jan. 25, 1977

[54] MAGNETIC RECORDING MEDIUM CONTAINING LUBRICANTS

[75] Inventors: Helmut Kopke, Ludwigshafen; Hans-Joerg Hartmann, Freinsheim; Dieter Mayer; Herbert Motz, both of Ludwigshafen, all of Germany

[73] Assignee: BASF Aktiengesellschaft, Ludwigshafen (Rhine), Germany

[22] Filed: Dec. 23, 1974

[21] Appl. No.: 536,008

[30] Foreign Application Priority Data

Dec. 28, 1973 Germany .......................... 2364879

[52] U.S. Cl. ............................ 428/425; 252/62.54; 427/127; 428/539; 428/447; 428/900
[51] Int. Cl.$^2$ ..................... C08G 77/42; H01F 1/26
[58] Field of Search ........... 427/127, 128; 428/447, 428/451; 252/49.6, 62.54

[56] References Cited

UNITED STATES PATENTS

| | | | |
|---|---|---|---|
| 2,654,681 | 10/1953 | Lueck | 252/62.54 |
| 3,404,997 | 10/1968 | Jacobson | 252/62.54 |
| 3,411,944 | 11/1968 | Higashi | 252/62.54 |
| 3,437,510 | 4/1969 | Diaz | 252/62.54 |
| 3,457,173 | 7/1969 | Pater | 252/49.6 |
| 3,480,583 | 11/1969 | Bailey et al. | 252/49.6 |
| 3,629,310 | 12/1971 | Bailey et al. | 252/49.6 |

Primary Examiner—George F. Lesmes
Assistant Examiner—R. J. Roche
Attorney, Agent, or Firm—Johnston, Keil, Thompson & Shurtleff

[57] ABSTRACT

A magnetic recording medium consists of a non-magnetic base, on which the magnetic coating is a layer of a dispersion, containing a lubricant, of a magnetic pigment in a polymeric binder. The lubricant is a block copolymer which contains siloxane units and alkyleneoxy units of 2 to 4 carbon atoms, the alkyleneoxy units being bonded to the polysiloxane radical through a Si—O—C or Si—C group. The use of this lubricant gives a magnetic recording medium which has the advantages of good fluid lubrication and an excellent coefficient of friction which does not vary with time.

6 Claims, No Drawings

MAGNETIC RECORDING MEDIUM CONTAINING LUBRICANTS

This application discloses and claims subject matter described in German Patent Application P 23,64,879.5, filed Dec. 28, 1973, which is incorporated herein by reference.

The invention relates to a magnetic recording medium consisting of a non-magnetic base provided with a magnetic coating based on finely divided magnetic pigment dispersed in a binder and containing a siloxane copolymer in the magnetic coating to improve the ease of slip on components of the recording equipment.

In recording and reproducing magnetic recordings on a magnetic recording medium it is necessary that the latter should travel in close contact past the head and possibly past guide pins and other metallic components, and if the magnetic coatings exhibit insufficient lubricity high frictional forces may be developed and can frequently lead to jerky travel, the so-called stick-slip effect. The latter term is used to describe the periodic alternation between a low friction state and a high friction state. It manifests itself whenever the friction is not a monotonic function of the speed and instead has ranges of decreasing intensity and ranges of increasing intensity. In practice, this effect manifests itself in a periodically fluctuating speed of the tape relative to the metal components with which it is in contact. This stick-slip is highly undesirable since it causes longitudinal vibrations of the tape and hence an objectionable frequency modulation of the recording. In addition, it produces running noises in the form of squeaks or whistles.

The occurrence of stick-slip is encouraged by a number of conditions of operation of the tape, which may or may not depend on the equipment. Thus, high wrap-round angles on the head and very smooth components in contact with the recording medium increase the effect. External conditions such as low atmospheric humidity and high temperatures also increase the effect. In the extreme, this effect can prevent start-up or even cause the tape to tear, particularly if the equipment has been standing for some time with the tape in contact with the head.

It is known to add certain amounts of a lubricant to magnetic recording media in order to reduce the friction between the magnetic coating and components of the equipment and also, as a consequence, to reduce abrasion of the coating and increase the life of the magnetic recording medium. A large number of different lubricants of different chemical nature and consistency have already been described for this purpose in the literature; examples are polydimethylsiloxanes, paraffin oils, waxes, saturated and unsaturated fatty acids, fatty acid esters, fatty acid amides, salts of fatty acids and also solid lubricants such as molybdenum disulfide, graphite, polytetrafluoroethylene powder and polytrichlorofluoroethylene powder.

If lubricants are added in the form of finely divided insoluble solids, the lubricating action is not distributed microscopically uniformly over the surface; instead, the solid particles are only present in certain localized areas on the surface and also, at the same concentration, in the interior of the magnetic coating. The density to which the surface has to be covered with lubricant particles in order to achieve sufficient lubricity implies relatively high concentrations of lubricant in the magnetic coating.

It is known that in general liquid lubricants have the advantage over solid lubricants that they cover the surfaces in question with a homogeneous, extremely thin surface film of only a few molecular layers, and the amount of lubricant added can be kept very low. A further advantage of liquid lubricants used with magnetic recording media which are subjected to frequent and heavy use is that the surface film of lubricant can re-form by diffusion of the lubricant from the interior of the magnetic coating. Further, it is known that amongst the range of liquid lubricants polymeric dimethylsiloxanes have a particularly advantageous anti-friction effect (German Pat. No. 877,213). However, many of the lubricants mentioned lower the friction of the magnetic coatings in which they are present, if added in suitable concentrations, without reliably reducing the stick-slip effect.

It is an object of the invention to provide coated magnetic recording media which on the one hand have the advantages of good liquid lubrication whilst, on the other hand, the stick-slip effect does not occur even under extreme conditions, such as operation on equipment with a large wrap-round angle on the head or operation at high temperature and low atmospheric humidity, and which have excellent slip properties.

We have found that magnetic recording media comprising a non-magnetic base material to which is applied a magnetic layer consisting of a dispersion, containing a lubricant, of a finely divided magnetic pigment in a polymeric binder substantially exhibit the desired properties if the lubricant present in the magnetic coating is a block copolymer containing siloxane units and alkyleneoxy units of 2 to 4 carbon atoms, the alkyleneoxy units being bonded to the polysiloxane radical through a Si—O—C or Si—C group.

The magnetic coatings of such magnetic recording media not only have the excellent slip properties of magnetic coatings which contain polysiloxanes but in addition show no stick-slip effect or squeaking even when operated under extreme conditions. Their stick-slip behavior, coupled with advantageous slip characteristics, make them distinctly superior to conventional magnetic coatings, for example magnetic coatings containing dimethylsiloxane or diphenylsiloxane oils as lubricants.

The magnetic coatings of the recording media according to the invention further show greatly reduced surface wear compared to media containing conventional lubricants, so that the surface shows no signs of use even after a 2 hours' sustained operation test on a friction tester.

Suitable block copolymers with siloxane units and alkyleneoxy units of 2 to 4 carbon atoms, which are suitably present in the magnetic coating in amounts of from 0.1 to 2 percent by weight and preferably from 0.2 to 1 percent by weight, based on the amount of magnetic pigment, are, above all, block copolymers (which term is intended to include graft copolymers) of polymeric alkyl-, aryl- or aralkylsiloxanes (which in general contain from 1 to 8 carbon atoms per alkyl, aryl, or aralkyl radical) with poly-1,2-alkylene oxides, especially poly-1,2-propylene oxide and/or polyethylene oxide or polyalkylene glycols of 2 to 4 carbon atoms and especially of 2 to 3 carbon atoms. Block copolymers of this type contain either Si—O—C or Si—C groups. Suitable silicone/polyalkylene oxide copolymers with Si—O—C groups can be obtained by reaction of polyethers, containing hydroxyl groups, with silanes or siloxanes which contain Si—O—C₂H₅ groups (cf. U.S. Pat. No. 2,834,748 and British Pat. No. 892,819), Si—H groups (cf. British Pat. Nos. 892,819 and 954,041) or Si—N groups (cf. British Pat. No. 1,071,568). Suitable siloxanepolyether copolymers in which the siloxane is bonded directly to the polyether be water-soluble or water-insoluble depending on the proportion of polyether.

Formulae I to V below show structural types of suitable block copolymers with siloxane and alkyleneoxy units; the block copolymers of the structural types represented by formulae I and III are preferred.

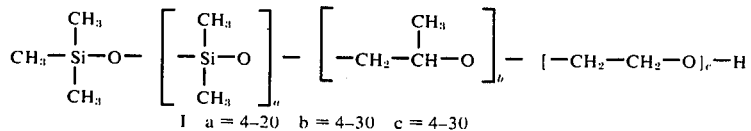

I   a = 4–20   b = 4–30   c = 4–30

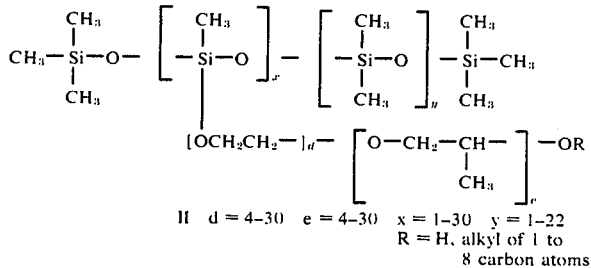

II   d = 4–30   e = 4–30   x = 1–30   y = 1–22
R = H, alkyl of 1 to 8 carbon atoms

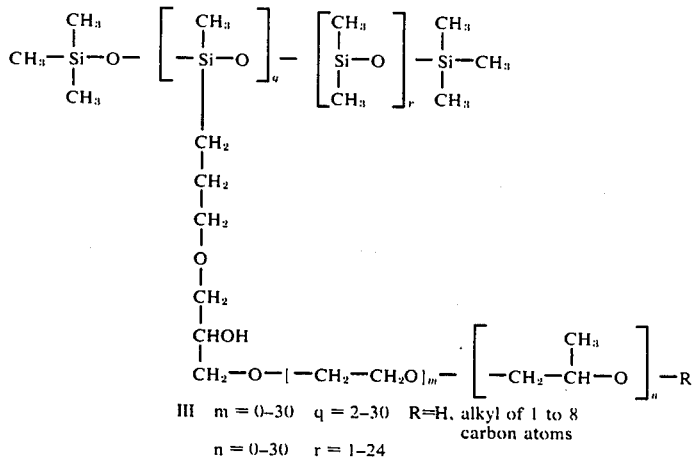

III   m = 0–30   q = 2–30   R=H, alkyl of 1 to 8 carbon atoms
n = 0–30   r = 1–24

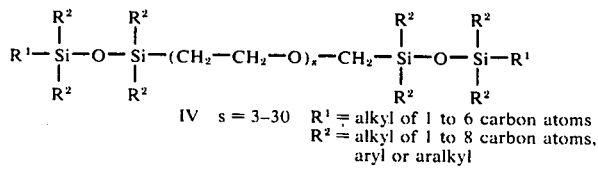

IV   s = 3–30   R¹ = alkyl of 1 to 6 carbon atoms
R² = alkyl of 1 to 8 carbon atoms, aryl or aralkyl

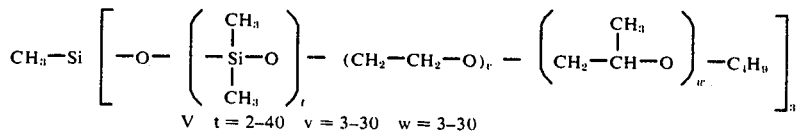

V   t = 2–40   v = 3–30   w = 3–30 through Si—C bonds can be obtained by addition of Si—H bonds to polyethers containing alkylene groups (cf. U.S. Pat. No. 2,868,824, French Pat. No. 1,179,743 and Belgian Pat. No. 603,553). A further suitable method for the manufacture of these compounds is to react siloxanes containing bromomethyl groups with the OH groups of polyethers in the presence of tertiary amides (cf. Belgian Pat. No. 603,832). Further suitable polysiloxane-polyether block copolymers are those which have been produced, in accordance with Belgian Pat. No. 627,281, by reaction of silicon compounds containing epoxy groups with the OH group of a polyether. Compounds of this type may Very suitable block copolymers are those in which the number of alkyleneoxy units of 2 to 4 carbon atoms is at least equal to the number, and preferably at least twice the number, and in particular about twice to 10 times the number, of siloxane units in the molecule. Preferably, the block copolymers contain a polysiloxane block of about from 4 to 60, and in particular from 4 to 30, siloxane units and a number of alkyleneoxy units of 2 to 4 carbon atoms equal to about from 1 to 10 times, and in particular from 2 to 8 times, the number of siloxane units in the molecule, the alkyleneoxy units being in the terminal and/or lateral positions of the molecule.

The magnetic coatings for the magnetic recording media of the invention can be produced by conventional methods. It has proved advantageous, when producing the magnetic coating on conventional equipment, to disperse the magnetic pigment in the binder, together with a sufficient amount of an organic solvent to give a suitable viscosity, and together with additives such as dispersing agents and lubricants. After the dispersing treatment, the resulting dispersion of the magnetic pigment can be applied by conventional methods, using a coater, on to a non-magnetizable substrate or suitable base. It is advantageous to induce a preferred magnetic direction in the tape, by use of an orienting magnetic field, during or after application of a layer of the dispersion to the base, in such a way that the orienting action comes into effect before the dispersion has dried. Suitable organic solvents for preparing the dispersion are the conventional organic solvents for this purpose, in particular aromatic hydrocarbons, such as benzene, toluene or xylene, alcohols, such as propanol or butanol, ketones, such as acetone or methyl ethyl ketone, ethers, such as tetrahydrofuran or dioxane, and mixtures of such solvents and other conventional solvents and solvent mixtures for surface coatings.

The magnetic pigment used is preferably finely divided acicular gamma-iron(III) oxide of average particle size from 0.2 to 2 $\mu$ and in particular from 0.1 to 0.9 $\mu$. Further suitable magnetic pigments for the coated magnetic recording media of the invention are cubic gamma-iron(III) oxide, cobalt-modified gamma-iron-(III) oxide and the finely divided alloys of heavy metals conventionally used for this purpose, in particular alloys of iron, cobalt and/or nickel, as well as ferromagnetic chromium dioxide.

Conventional fillers and/or pigments, such as carbon black, graphite, quartz powder and/or non-magnetizable silicate-based powders can also be added by conventional methods to the dispersions used to produce the magnetic coatings, but the amount of these additives should suitably not be more than 12 percent by weight, preferably not more than 8 percent by weight, based on the dry weight of the magnetic coating.

Binders which can be used for the dispersion of the finely divided magnetic pigment are the conventional binders for producing magnetic coatings, copolyamides which are soluble in alcoholic solvents, polyvinylformals, polyurethane elastomers, mixtures of polyisocyanates and high molecular weight polyhydroxy compounds and vinyl chloride polymers containing more than 60% of vinyl chloride structural units, for example vinyl chloride copolymers with comonomers such as vinyl esters of monocarboxylic acids of 2 to 9 carbon atoms, esters of aliphatic alcohols of 1 to 9 carbon atoms and ethylenically unsaturated carboxylic acids of 3 to 5 carbon atoms, such as the esters of acrylic acid or methacrylic acid or maleic acid, or these carboxylic acids as such, and also vinyl chloride copolymers, containing hydroxyl groups, which can be manufactured by partial saponification of vinyl chloride/vinyl ester copolymers or direct copolymerization of vinyl chloride with monomers containing hydroxyl groups, such as ally alcohol or 4-hydroxybutyl acrylate or methacrylate or 2-hydroxyethyl acrylate or methacrylate. Further suitable binders are mixtures of polyurethane elastomers with polyvinylformals, phenoxy resins and PVC copolymers of the above composition. Preferred binders are polyvinylformals and polyurethane elastomer mixtures of the above type, above all mixtures with polyvinylformals. Preferred polyurethane elastomer binders are commercially available elastomeric polyester-urethanes obtained from adipic acid, 1,4-butanediol and 4,4'-diisocyanatodiphenylmethane.

In general, approx. from 2.5 to 4.5 parts by weight of binder are used per approx. from 10 to 13 parts by weight of gamma-iron(III) oxide magnetic pigment when producing flexible magnetic recording media with binders based on vinyl chloride polymers. If the type of binder or magnetic pigment is changed, the ratio is suitably modified in accordance with the change in specific gravity of the magnetic pigment or of the binder.

Non-magnetic base materials which can be used as the substrate for the magnetic coating are the conventional materials for this purpose, preferably flexible base materials such as films or tapes of polyvinyl chloride or polyesters, for example polyethylene terephthalate films of the conventional gauges for this purpose. The application of an adhesion-promoting intermediate layer, for example based on a vinylidene chloride copolymer, to the substrate before applying the magnetic coating is possible and in some cases desirable.

After applying the magnetic coating, the latter can advantageously be surface-finished or polished with heated rollers and the resulting coated film is then cut to the desired widths of the magnetic tapes, on the conventional machinery for the manufacture of magnetic recording media. In general, the thickness of the magnetic coating is from 2 to 15 $\mu$.

Compared to conventional magnetic recording media of a similar type, the magnetic recording media of the invention show a constant and lower coefficient of friction and reliably avoid the occurrence of stickslip. Because of their low coefficient of friction, such magnetic coatings produce little wear of equipment components, a condition which a magnetic coating has to fulfil particularly when hard abrasive pigments, such as ferromagnetic chromium dioxide, are used. It is in fact found, when using the lubricants of the invention, that magnetic coatings containing chromium dioxide also give coefficients of friction and data used to characterize metal abrasion (Mu-metal), which do not significantly exceed the known good values shown by iron oxide tapes.

The parts and percentages in the examples and comparative experiments which follow are by weight, unless stated otherwise. The relation of parts by volume to parts is as of the liter to the kilogram.

EXAMPLE 1

900 parts of a fine acicular gamma-iron(III) oxide of average particle length less than 0.8 $\mu$, 406 parts of tetrahydrofuran, 406 parts of dioxane in which are dissolved 76 parts of a polyvinylformal binder (83% of vinylformal units, 12% of vinyl acetate units and 6% of vinyl alcohol units), 18 parts of sodium oleate and 10.2 parts of a phthalic acid diisododecyl ester are subjected to a preliminary dispersing treatment for 70 hours in a ball mill of capacity 6,000 parts by volume, filled with 6,000 parts by weight of steel balls of diameter from 4 to 6 mm. A further 123 parts of the above binder, dissolved in 660 parts of dioxane and 660 parts of tetrahydrofuran, 16.8 parts by weight of phthalic acid diisododecyl ester and 4.5 parts by weight of a poly-(ethoxypropoxydimethyl-siloxane), of the structural type shown in the above formula I and composed of 6 dimethylsiloxane units, 20 ethoxy units and 20 propoxy units, dissolved in 70 parts of tetrahydrofuran and 70 parts of dioxane, are then added to the dispersion and the dispersing treatment is continued for a further 24 hours. The dispersion is then filtered under pressure by the conventional technique, and is applied to a polyethylene terephthalate film, which is passed through a magnetic orienting field and then dried at temperatures from 50° to 90° C. The magnetic coating is polished and densified by drawing it over polished and heated rollers under pressure at temperatures from 50° to 80° C. After satinizing, the thickness of the magnetic coating is 10$\mu$.

Test

The effectiveness of the lubricant is assessed from the coefficient of friction of the magnetic coating against metal articles and the stick-slip behavior of the magnetic coating. The latter behavior is measured with a capstan apparatus as described by Owens, J. Applied Polymer Sci. 8, 1465 (1964). The drum consists of carbide with a peak-to-valley height of Ra = 0.02$\mu$. This apparatus makes it possible to record the dependence of friction on speed in the range from 1 cm/sec to 40 cm/sec. The occurrence of stick-slip within this range can be seen readily from the speed graph. The measurements obtained from the test characterize the level of friction and the amplitude of the stick-slip fluctuations. Good lubricants are distinguished by a low coefficient of friction and by minimum amplitudes of the stick-slip fluctuations.

The time dependence of the friction at 4.75 cm/sec, and the accompanying stick-slip amplitudes, are measured on tapes cut to a width of 6.25 mm. The graph showing the friction as a function of speed is also established.

The test results are shown in Table 1.

EXAMPLE 2

The procedure followed is that in Example 1 but the block copolymer described there, of the structural type of formula I, containing siloxane and alkyeneoxy units, is replaced by a block copolymer of the structural type of formula III with $m = 0$, consisting of 25 parts of siloxane units and 75 parts of polypropylene oxide. The results of tests, carried out as in Example 1, on the magnetic tapes obtained are shown in Table 1.

Comparative Experiments A to G

In Comparative Experiments A to G below, the procedure of Examples 1 and 2 is followed, but the block copolymer with siloxane and alkyleneoxy units is replaced by other lubricants. The results of tests, carried out as in Example 1, on the magnetic tapes obtained are shown in Table 1.

Comparative Experiment A 4.5 parts of a dimethyl-silicone oil (of viscosity 35 cP) were used.

Comparative Experiment B 4.5 parts of a dimethyl-silicone oil (of viscosity 300 cP) were used.

Comparative Experiment C 4.5 parts of a diphenyl-silicone oil (of viscosity 250 cP) were used.

Comparative Experiment D 4.5 parts of oleic acid were used.

Comparative Experiment E 4.5 parts of stearyl stearate were used.

Comparative Experiment F 4.5 parts of white petroleum jelly were used.

Comparative Experiment G 4.5 parts of di-n-octyl azelate were used.

TABLE 1

Results of Tests on Magnetic Tapes manufactured according to Examples 1 and 2 and according to Comparative Experiments A to G

| Experiment | Coefficient of friction at 4.75 cm/sec. $\mu$ | Stick-slip amplitude $\Delta\mu$ | Wear | Squeaking after 24 hours' operation at 40° C and 35% relative humidity |
|---|---|---|---|---|
| Example 1 | 0.38 | ± 0.01 | slight | none |
| Example 2 | 0.35 | ± 0.01 | very slight | none |
| Comparative Experiment A | 0.46 | ± 0.11 | medium | severe |
| Comparative Experiment B | 0.48 | ± 0.10 | medium | medium |
| Comparative Experiment C | 0.51 | ± 0.12 | severe | severe |
| Comparative Experiment D | 0.38 | ± 0.06 | medium | slight |
| Comparative Experiment E | 0.46 | ± 0.10 | medium | slight |
| Comparative Experiment F | 0.51 | ± 0.09 | medium | medium |
| Comparative Experiment G | 0.49 | ± 0.06 | slight | slight |

Table 1 shows that the tapes according to the invention have a particularly favorable coefficient of friction. The periodic fluctuations in the coefficient of friction, used as a measure of the stick-slip amplitude expressed As $\Delta\mu$u, are particularly slight with these tapes. The tapes according to the invention produce particularly little wear on the head and metal components and themselves suffer little wear in sustained operation. The extremely low stick-slip amplitude of the tapes according to the invention ensures a constant tape feed free from longitudinal vibrations.

EXAMPLE 3

650 parts by weight of a fine acicular chromium dioxide of average particle length less than 0.6 $\mu$, 490 parts of tetrahydrofuran, 490 parts of dioxane in which are dissolved 56 parts of a polyvinylformal binder (83% of vinylformal units, 12% of vinyl acetate units and 6% of vinyl alcohol units), 16.25 parts of zinc oleate and 5.57 parts of a phthalic acid diisododecyl ester are subjected to a preliminary dispersing treatment in a ball mill of capacity 6,000 parts by volume, filled with 6,000 parts by weight of steel balls of diameter from 4 to 6 mm. A further 81.5 parts of the above binder, dissolved in 440 parts of tetrahydrofuran and 440 parts of dioxane, as well as 8 parts of phthalic acid diisododecyl ester and 9.75 parts of a poly-(ethoxy-propoxy-dimethylsiloxane), of the structural type shown in formula I and containing six dimethylsiloxane units, 20 ethoxy units and 20 propoxy units, are then added to the dispersion and the dispersing treatment is continued for a further 24 hours. The further method used is analogous to Example 1, as are the tests on the resulting magnetic tapes, the results of which are shown in Table 2.

EXAMPLE 4

The procedure followed is as in Example 3, but the block copolymer described there is replaced by a block copolymer of the structural type of Formula III with $m = 0$, consisting of 25 parts of dimethylsiloxane units and 75 parts of polypropylene oxide. The result of the tests on the resulting magnetic tapes, carried out as in Example 1, is shown in Table 2.

EXAMPLE 5

630 parts of a fine acicular chromium dioxide of average particle length less than $0.6\mu$, 455 parts of tetrahydrofuran and 455 parts of dioxane in which are dissolved 47 parts of a commerically available polyester-urethane (produced from adipic acid, 1,4-butanediol, and 4,4′-diisocyanatodiphenyl-methane) and 24 parts of a polyvinylformal binder (83% of vinylformal units, 12% of vinyl acetate units and 6% of vinyl alcohol units), and 16 parts of zinc oleate are subjected to a preliminary dispersing treatment for 72 hours in a ball mill of capacity 6,000 parts by volume, filled with 6,000 parts of steel balls of diameter from 4 to 6 mm. A further 47 parts of the above polyester-urethane and 23 parts of the polyvinylformal binder, dissolved in 455 parts of tetrahydrofuran and 455 parts of dioxane, and 3.15 parts of a poly-(ethoxy-propoxy-dimethylsiloxane), of the structural type shown in the above formula I and composed of six dimethylsiloxane units, 20 ethoxy units and 20 propoxy units, are then added to the dispersion and the dispersing treatment is continued for a further 40 hours. The further treatment of the dispersion is carried out as in Example 1, as are the tests on the resulting magnetic tapes, the results of which are shown in Table 2.

EXAMPLE 6

The procedure followed is as in Example 5 except that the poly-(ethoxy-propoxy-dimethylsiloxane) used there is replaced by a block copolymer of the structural type of formula II with $m = 0$, consisting of 25 parts of dimethylsiloxane units and 75 parts of polypropylene oxide.

Comparative Experiments H to N

In Comparative Experiments H to N below, the procedure followed is as in Examples 3 and 4, but the above block copolymer containing siloxane units and alkylene oxide units is replaced by an equal amount by weight of another lubricant. The results of the tests on the resulting magnetic tapes, carried out as in Eample 1, are shown in Table 2.

Comparative Experiment H 9.75 parts of a dimethyl-silicone oil (of viscosity 35 cP) were used.

Comparative Experiment I 9.75 parts of a dimethyl-silicone oil (of viscosity 300 cP) were used.

Comparative Experiment K 9.75 parts of a diphenyl-silicone oil (of viscosity 250 cP) were used.

Comparative Experiment L 9.75 parts of oleic acid were used.

Comparative Experiment M 9.75 parts of stearyl steareate were used.

Comparative Experiment N 9.75 parts of white petroleum jelly were used.

Comparative Experiment O to Q

In Comparative Experiments O to Q below, the procedure followed is as in Example 5 and 6, but the above block copolymer containing siloxane units and alkylene oxide units is replaced by an equal amount by weight of another lubricant. The results of the tests on the resulting magnetic tapes, carried out as in Example 1, are shown in Table 2.

Comparative Experiment O 3.15 parts of a dimethyl-silicone oil (of viscosity 35 cP) were used.

Comparative Experiment P 3.15 parts of oleic acid were used.

Comparative Experiment Q 3.15 parts of butyl stearate were used.

Table 2 contains the test results on chromium dioxide magnetic tapes containing different lubricants. Chromium dioxide tapes produced according to the invention have a particularly low coefficient of friction and a low stick-slip amplitude, and show little wear. When these tapes were operated at elevated temperatures and low atmospheric humidity, no squeaking occurred even after 24 hours' operation, in contrast to the tapes containing conventional lubricants.

TABLE 2

Results of Tests on Magnetic Tapes manufactured according to Examples 3 and 6 and according to Comparative Experiments H to Q

| Experiment | Coefficient of friction at 4.75 cm/sec. $\mu$ | Stick-slip amplitude $\Delta\mu$ | Wear | Squeaking after 24 hours' operation at 40° C and 35% relative humidity |
|---|---|---|---|---|
| Example 3 | 0.42 | 0.02 | very slight | — |
| Example 4 | 0.40 | 0.03 | very slight | — |

TABLE 2-continued

Results of Tests on Magnetic Tapes manufactured according to Examples 3 and 6 and according to Comparative Experiments H to Q

| Experiment | Coefficient of friction at 4.75 cm/sec. $\mu$ | Stick-slip amplitude $\Delta\mu$ | Wear | Squeaking after 24 hours' operation at 40° C and 35% relative humidity |
| --- | --- | --- | --- | --- |
| Comparative Experiment H | 0.76 | 0.15 | severe | severe |
| Comparative Experiment I | 0.54 | 0.11 | medium | slight |
| Comparative Experiment K | 0.63 | 0.09 | severe | severe |
| Comparative Experiment L | 0.49 | 0.06 | slight | slight |
| Comparative Experiment M | 0.49 | 0.09 | medium | slight |
| Comparative Experiment N | 0.55 | 0.09 | medium | squeaks |
| Example 5 | 0.37 | 0.01 | very slight | — |
| Example 6 | 0.35 | 0.01 | very slight | — |
| Comparative Example O | 0.56 | 0.10 | medium | severe |
| Comparative Example P | 0.44 | 0.06 | slight | slight |
| Comparative Example Q | 0.45 | 0.06 | slight | slight |

We claim:

1. A magnetic recording medium comprising a non-magnetic base material and a magnetic coating applied thereon in the form of a dispersion, containing a lubricant, of a finely divided magnetic pigment in a polymeric binder, wherein the lubricant in the magnetic coating is a block copolymer containing alkyl-, aryl- or aralkyl-siloxane units which contain from about 1 to 8 carbons per alkyl, aryl or aralkyl radical and alkyleneoxy units of 2 to 4 carbon atoms, the alkyleneoxy units being bonded to the polysiloxane radical through a Si—O—C or Si—C group.

2. A magnetic recording medium as claimed in claim 1, wherein the amount of block copolymer present in the magnetic coating is from 0.1 to 2 percent by weight, based on the amount of magnetic pigment.

3. A magnetic recording medium as claimed in claim 1, wherein the number of alkyleneoxy units of 2 to 4 carbon atoms in the block copolymer is at least equal to the number, and preferably at least twice the number, of siloxane units.

4. A magnetic recording medium as claimed in claim 1, wherein the block copolymer contains a polysiloxane block of about four to 60 siloxane units and alkyleneoxy units of 2 to 4 carbon atoms numbering about one to 10 times the number of siloxane units in the molecule and bonded to the terminal and/or lateral positions of the molecule.

5. A magnetic recording medium as claimed in claim 1, wherein the polymeric binder of the magnetic coating is an elastomeric polyurethane and/or polyvinylformal.

6. A magnetic recording medium as claimed in claim 1, wherein the non-magnetic base material is a flexible plastic film.

* * * * *